United States Patent
Brian

[11] Patent Number: 5,997,012
[45] Date of Patent: Dec. 7, 1999

[54] DIFFERENTIAL THREAD CONTROL OF CHUCK GRIPPING OF WORK

[76] Inventor: Frank J. Brian, 3701 Ahern St., Baldwin Park, Calif. 91706

[21] Appl. No.: 09/082,319

[22] Filed: May 21, 1998

Related U.S. Application Data

[63] Continuation-in-part of application No. 08/671,173, Jun. 27, 1996, Pat. No. 5,758,883.

[51] Int. Cl.$^6$ ................................................. B23B 31/20
[52] U.S. Cl. ..................... 279/43.5; 279/43.2; 279/43.3; 403/290; 403/313; 409/234
[58] Field of Search .................... 279/43.3, 43.1, 279/43.2, 43.4, 43.5, 9.1; 403/290, 313; 409/234

[56] References Cited

U.S. PATENT DOCUMENTS

| | | | |
|---|---|---|---|
| 216,516 | 6/1879 | Green . | |
| 253,581 | 2/1882 | Butler | 269/241 |
| 299,886 | 6/1884 | Westbrook | 279/43.5 |
| 429,105 | 5/1890 | Avery | 269/241 |
| 493,231 | 3/1893 | Muir | 279/49 |
| 667,105 | 1/1901 | Sloan | 279/43.3 |
| 842,609 | 1/1907 | Apgar | 279/43.3 |
| 1,311,406 | 7/1919 | Lapham et al. | 279/43.3 |
| 1,447,448 | 3/1923 | Walch | 403/290 |
| 2,038,602 | 4/1936 | Redinger | 279/43.2 |
| 2,421,174 | 5/1947 | Wyrick | 279/16 |
| 3,652,100 | 3/1972 | Baturka | 279/51 |
| 3,876,318 | 4/1975 | Crispell | 403/290 |
| 4,142,811 | 3/1979 | Burnham | 403/290 |
| 4,198,038 | 4/1980 | Quinter | 269/137 |
| 4,479,666 | 10/1984 | Welsh et al. | 285/4 |
| 4,603,889 | 8/1986 | Welsh | 285/175 |
| 4,611,960 | 9/1986 | Quenneville et al. | 409/234 |
| 4,708,039 | 11/1987 | Redman | 82/2.5 |
| 5,758,883 | 6/1998 | Brian | 279/53 |

FOREIGN PATENT DOCUMENTS

| | | | |
|---|---|---|---|
| 149834 | 7/1951 | Australia | 279/53 |
| 398390 | 6/1909 | France | 279/52 |
| 10622108 | 3/1967 | United Kingdom | 279/53 |

Primary Examiner—Steven C. Bishop
Attorney, Agent, or Firm—William W. Haerliger

[57] ABSTRACT

An apparatus for adjusting the grip of a tubular chuck upon work, the chuck receivable in a bore formed by a holder, and comprising a rotatable connector member having first and second thread connections for exerting force transmitted to the chuck; the head connections characterized as differential, whereby as the member is rotated, the chuck closes toward the work, with high mechanical advantage; the chuck defining a first axis; the connector member defining a second axis generally transverse to the first axis, the axes being non-interconnecting.

12 Claims, 5 Drawing Sheets

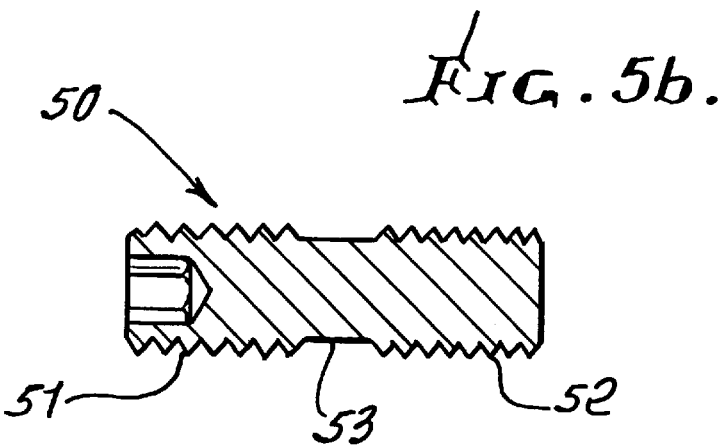
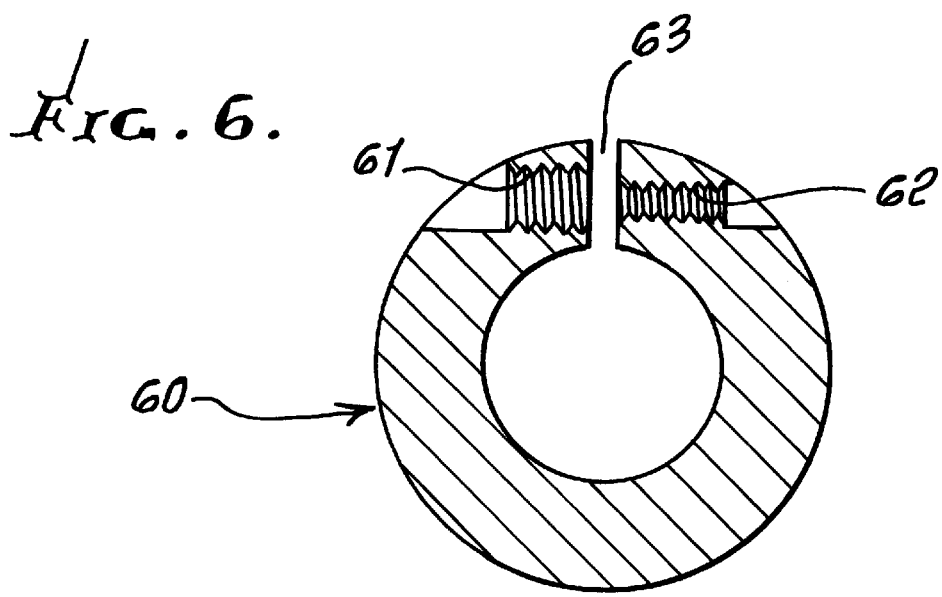
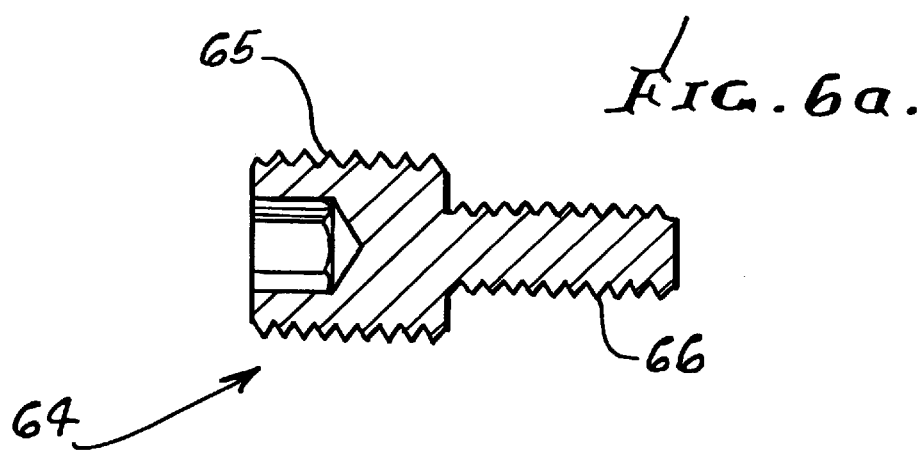

DIFFERENTIAL THREAD CONTROL OF CHUCK GRIPPING OF WORK

This application is a continuation-in-part of U.S. application Ser. No. 08/671,173 filed Jun. 27, 1996, now U.S. Pat. No. 5,758,883 incorporated herein by reference.

BACKGROUND OF THE INVENTION

This invention relates generally to collet support of work, such as machine tool shafts or shanks, and more particularly to fine adjustment of such shanks, as during connection and disconnection of tool shanks to and from collets.

Connection of machine tool shanks, as for example milling tool shanks, to collets for support during rotary milling, requires that the collets be precision connected to the rotary bodies of tool holders. This requires accurate, forcible, axial displacement, i.e., jamming, of conical portions of collets into conical bores of such holders, for frictional interconnection. A high degree of axial force is thereby required; and, when the tool shank is to be removed, a high degree of collet extraction axial force is required to break the frictional interconnection.

Originally, tool holders were simple side locking devices, with set screws pushing a tool to one side to hold it in place. Next came various collet and chuck methods to hold tools. The more recent versions of these use complicated hydraulic or mechanical devices to try to hold the tool fixed coaxially. The most recent means for doing this is to shrink fit the tool in the holder body.

A side lock holder is deficient for coaxiality and fixity. Collet devices are more advantageous for coaxial holding, but less advantageous for fixity. Chucks in general are acceptable for coaxial holding, but are deficient for fixity because they employ thin sections in order to collapse, even with the more sophisticated hydraulic or milling chucks.

The shrink fit holder has drawbacks related to requiring 400-degree temperature, and hand loading a tool. Heating cycles are limited because the tool tends to lose its memory. Also, tool removal is a major problem whether done by reheating or mechanical means. In smaller sizes the tool tends to come loose and move in the holder because of the limited compression available from shrink fitting.

Another factor which affects the shrink fit holder is the finish on the mating surfaces. A rougher surface is desirable in order to prevent slippage; however, a rough surface will not last as long as desirable, before it begins to wear, causing a loss of grip.

There is need for an improved tool holder that will overcome problems, as referred to.

SUMMARY OF THE INVENTION

It is a major object of the invention to provide improved apparatus meeting the above needs. Basically, apparatus is provided for adjusting the grip of a tubular chuck upon work, the chuck receivable in a bore formed by a holder, and comprising in combination:

a) a rotatable connector member having first and second thread connections for exerting force transmitted to the chuck, b) the thread connections characterized as differential, whereby as the member is rotated, the chuck closes toward the work, with high mechanical advantage, c) the chuck defining a first axis, d) the connector member defining a second axis generally transverse to the first axis, the axes being non-intersecting.

As will be seen, the chuck typically defines a tool-holding bore, and the rotatable connector member may be located externally of and at one side of the tool-holding bore.

It is another object to provide for an extremely compact assembly, wherein the chuck has at least one slit therein which reduces in width as the chuck is urged toward the work; and further wherein the connector member intersects the slit. Further, the slit defines a plane, which may typically intersect a region on the connector member which lies between the differential thread connections. In this regard, the first and second thread connections have first and second threads, respectively, the first thread having first pitch, and the second thread having second pitch, the first and second pitches being different.

Additional objects include provision of a work holder that collapses radially to insure coaxiality, unlike side lock holders. The holder typically is of rugged one-piece construction for simplicity, unlike milling chucks or hydraulic chucks. The collapse can be made and broken a large number of times without deterioration, and no heat is involved, unlike shrink fit holders.

Due to the utilization of differential threads, the clamp force is extremely high, unlike conventional collet chucks, milling chucks, and hydraulic chucks.

The open-to-close range of the tool holder to tool allows the tool to be slipped in easily, set for length, and then tightened to its clamp position. This process is difficult to accomplish with a hot part.

Repeatable clamp force is obtained by use of a simple torque wrench on the differentially threaded device(s), which brings it to the specified torque.

These and other objects and advantages of the invention, as well as the details of an illustrative embodiment, will be more fully understood from the following specification and drawings, in which:

DRAWING DESCRIPTION

FIG. 5b is a side view of the connector member seen in FIG. 4;

FIG. 6 is a view like FIG. 4 showing a further modified chuck;

FIG. 6a is a side elevation showing a connector member usable with the FIG. 6 chuck;

DETAILED DESCRIPTION

Figure 1:
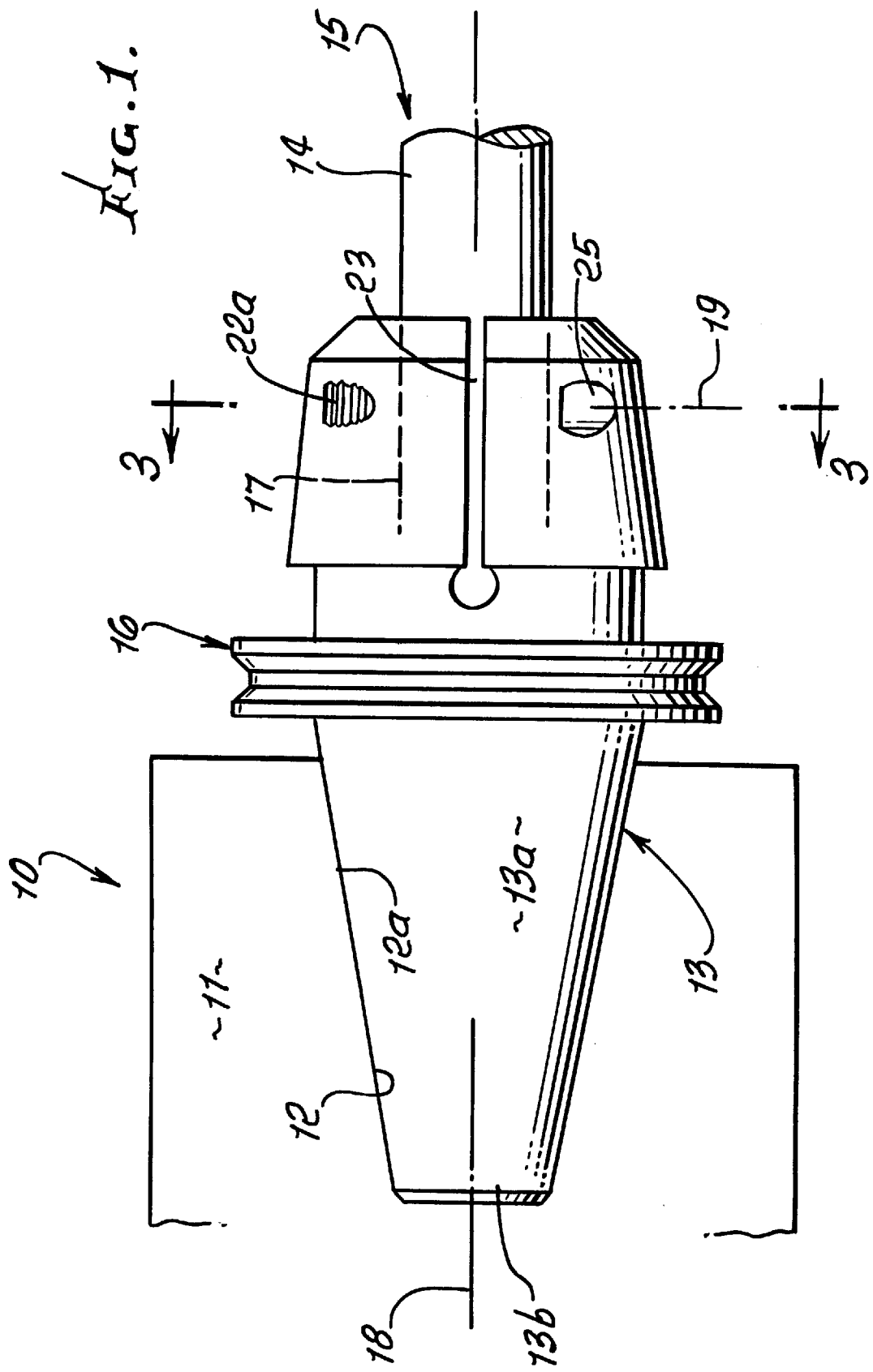
FIG. 1 is a side elevation showing a chuck incorporating the invention.

As shown in FIG. 1, a holder such as spindle 10 has an annular body 11, and an axial bore 12 into which a chuck or tool holder 13 is endwise receivable. That bore is shallowly tapered at 12a to receive the matching externally tapered surface 13a of the chuck, for frictional engagement therewith, as the conical end 13b of the chuck is inserted endwise into the bore.

The chuck is adapted to grip a shank 14 of a rotary tool 15, to hold and position the tool during a cutting operation, as for example, milling. Note sheave 16 integral with the chuck, to facilitate automatic tool change. Other type tools may be employed. In this regard, the chuck must be displaced radially inwardly, so as to grip the surface of shank 14, for positive coaxial positioning, during cutting; also the jammed interfit at 17 is capable of being broken or released during tool replacement.

In accordance with the invention, a rotatable connector member, for example is seen at 20, is provided to have first and second thread connections, for exerting force transmitted to the chuck, such thread connections characterized as differential, whereby as the connector member 20 rotated clockwise, the chuck closes toward the work, with very high mechanical advantage. Typically, the chuck defines a first axis 18, and the connector member 20 defines a second axis 19, or transverse to axis 18, those axes being skew or non-intersecting. See FIG. 3.

Such differential thread connections enable a relatively small radially inward displacement of the chuck bore 13a in response to a relatively large degree of differential thread rotation, i.e., with a very high mechanical advantage, that is, easy development of a high degree of radial force to jam the chuck bore against the work surface, i.e., to grip the work shank 14, and conversely, easy development of a high degree of reverse radial force to release or "break" the chuck bore from the work shank, to release the work shank.

Figure 4:
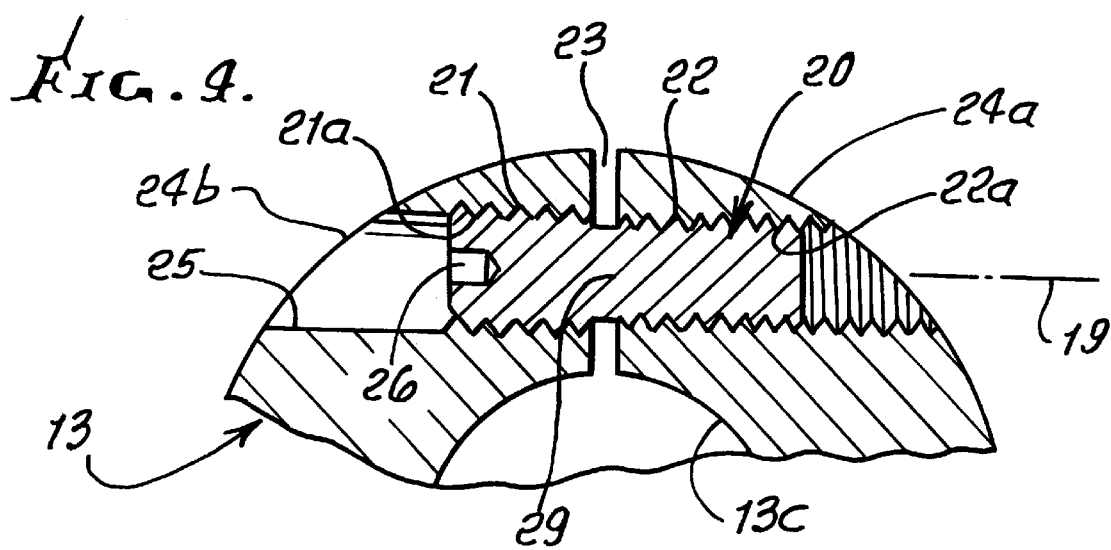
FIG. 4 is an enlarged fragmentary section showing a connector member interfitting the chuck.

As shown in FIG. 4, member 20 is in the form of a rotary fastener having first and second screw thread connections 21 and 22 spaced apart along axis 19, and respectively threadedly engaged with differential thread connections 21a and 22a formed in the chuck, at axially opposite sides of a radial split or slit 23 formed in the chuck. The pitches of threads 21 and 21a are different from the pitches of threads 22 and 22a. Thus, the connector first thread connection includes first threads having first load flanks which face in one axial direction, and the connector second thread connection includes second threads having second load flanks which face in the opposite axial direction, the first flanks defining a first pitch and the second threads defining a second pitch, the pitches being different.

Accordingly, as the member 20 is rotated clockwise, the split 23 is slowly reduced in width, and the bore 13a increasingly grips the work shank 14. Threads 21 and 21a at one side of split 23 may have slightly larger root diameters than threads 22 and 22a, at the opposite side of split 23, as shown. Also, thread 22a extends to the outer surface 24a of the chuck, while threads 21 and 21a are spaced from outer surface extent 24a of the chuck, a smooth bore 25 extending from surface extent 24b to the beginning of thread 21a, as seen in FIG. 4.

A polygonal wrench recess 26 is formed in the end of member 20, as shown. Split or slit 23 defines a radial plane containing axis 18, and intersects a mid-region 29 of the connector member 20 that lies between the differential thread connections, as described.

Figure 2:
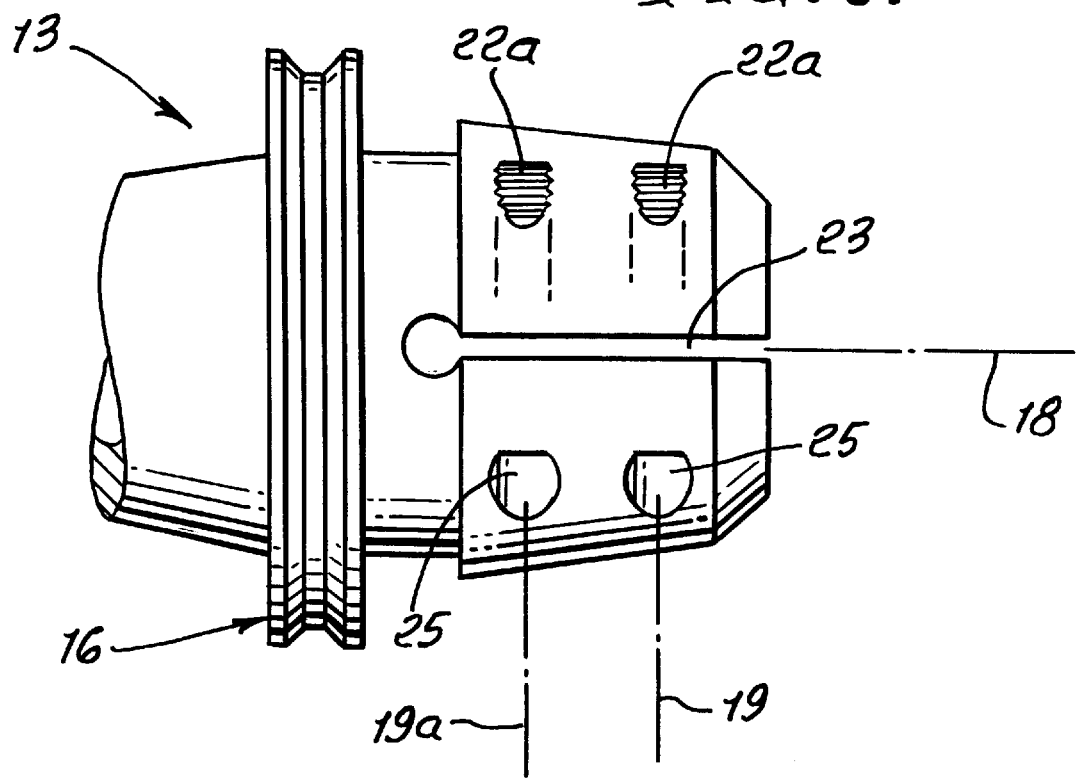
FIG. 2 is a view like FIG. 1 showing a modified chuck.

FIG. 2 is like FIGS. 1–4, but include a second set of threads 21a and 22a, for reception of differential threads 21 and 22 on a second connector member, the axis 19a of which extends parallel to axis 19. Split 23 intersects both axes 19 and 19a, which are spaced apart in the lengthwise direction of axis 18.

Figure 3:
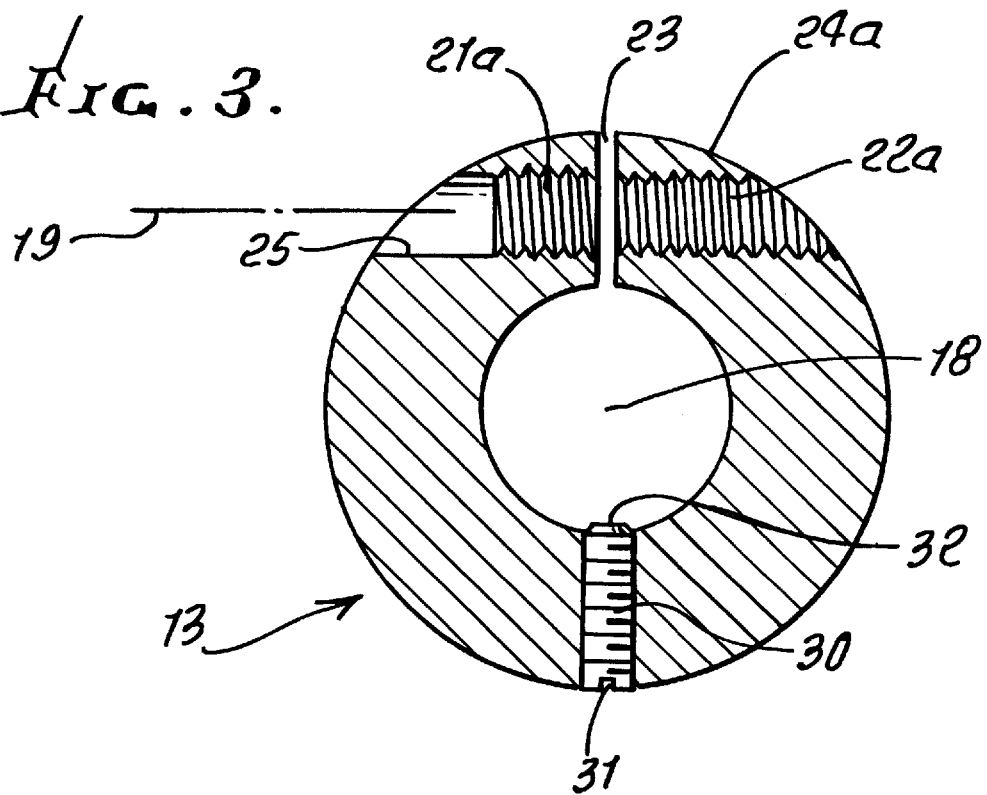
FIG. 3 is a section taken on lines 3—3 of FIG. 1.

FIG. 3 shows the addition of a set screw 30 extending radially in the body of the chuck, and adjustable at 31 to grip the work at end 32 of the set screw.

Figure 5:
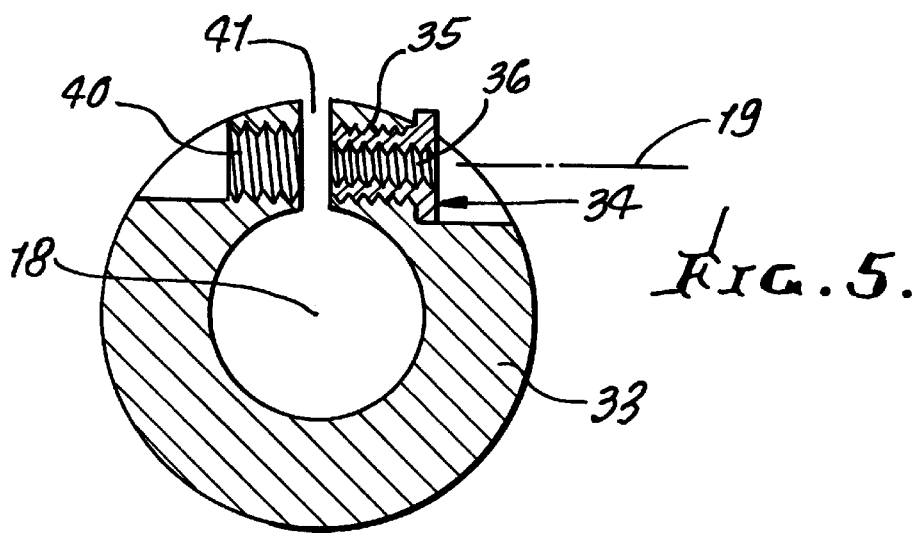
FIG. 5 is a section like that of FIG. 4 showing a modified chuck structure.
Figure 5A:
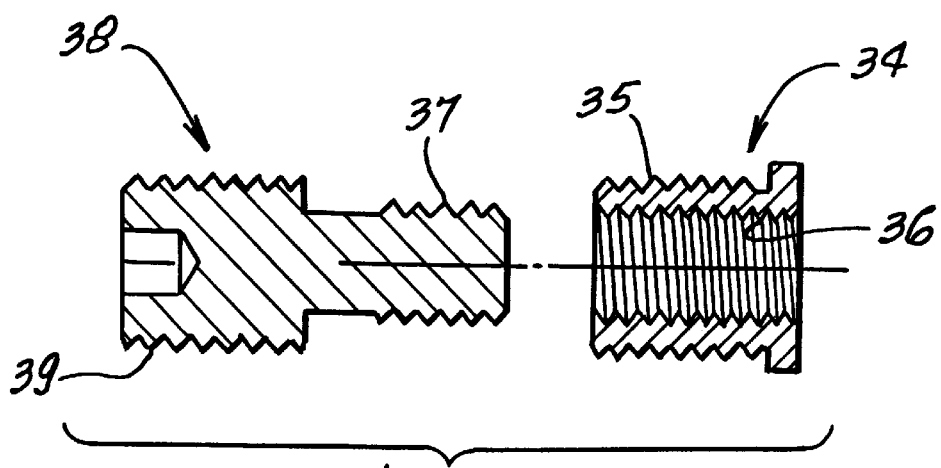
FIG. 5a is an exploded side view of a connector member and an insert, which is also seen in FIG. 5.

FIGS. 5 and 5a show provision of a tubular insert 34 thread connected at 35 to the modified chuck 33 and forming a threaded bore 36 adapted to receive the threading 37 of connector member 38. Threading 37 corresponds to thread 22 of member 20; and threading 39 on member 38 corresponds to thread 21 of member 20. Threading 39 interfits thread 40 on the modified chuck 33. Note gap 41 between 37 and 39.

Threads 37 and 39 are differential threads, as are threads 36 and 40. An end flange 42 on the insert is engageable with end wall 43 of the recess 44 cut into the side of the chuck. Axial radial split 45 defines a plane that intersects the gap 38.

FIG. 5b shows an insert 50 having differential threads at 51 and 52, which are axially spaced at opposite sides of a gap 53. Threads 51 and 52 have the same root diameter.

FIG. 6 shows a modified chuck 60 having differential threading 61 and 62 at opposite sides of an axial radial split 63. Threads 62 are substantially reduced in diameter. The connector member 64 of FIG. 6a has differential threads 65 and 66 sized to interfit the respective threads 61 and 62.

Figure 7:
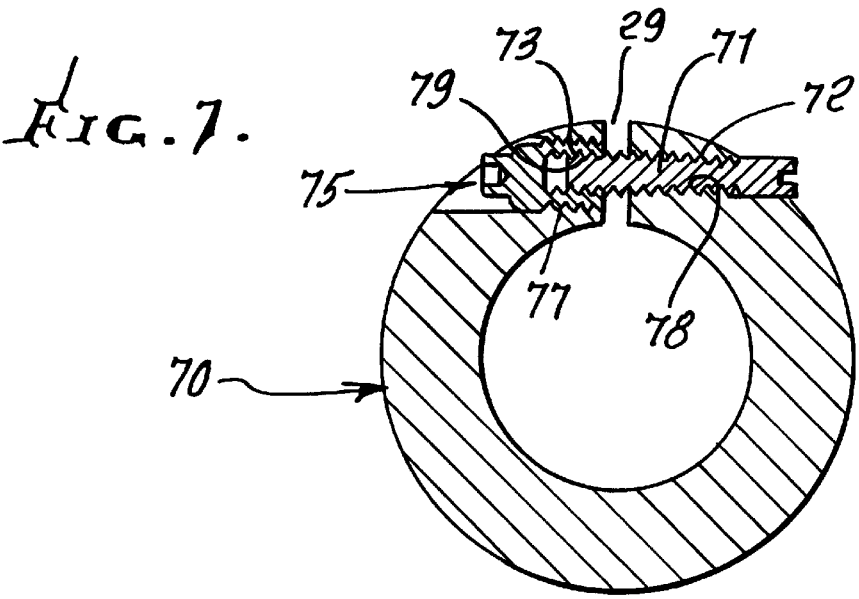
FIG. 7 is a view like FIG. 4 showing a yet further modified chuck and connector member.

FIG. 7 is like FIG. 5, except that insert 75 is endwise adjustable, at 76, in a threaded connection at 77 to the chuck 70. Connector member 71 has differential threads 72 and 73 at opposite sides of a split 29, and which respectively engage differential threads 78 and 79 in the chuck and in the insert 75.

Figure 7A:
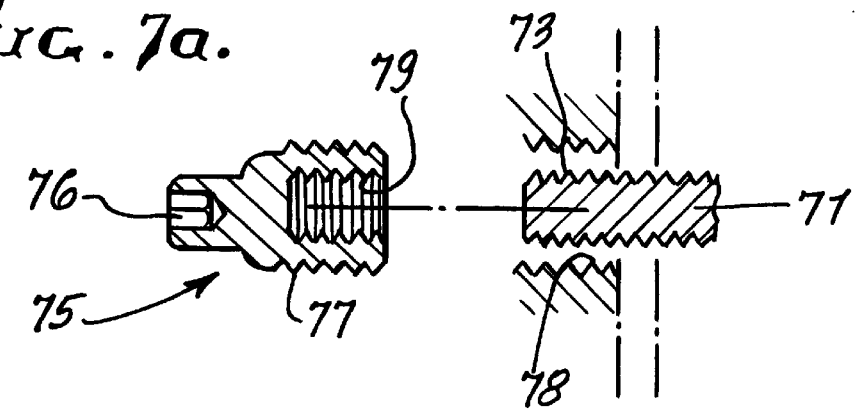
FIG. 7a is an enlarged axially exploded view of the connector member of FIG. 7.

FIG. 7a also shows details of the arrangement.

Reference is now made to further details of the differential threads, which may be of the type disclosed in U.S. Pat. No. 4,603,889, to Welsh.

Figure 8:
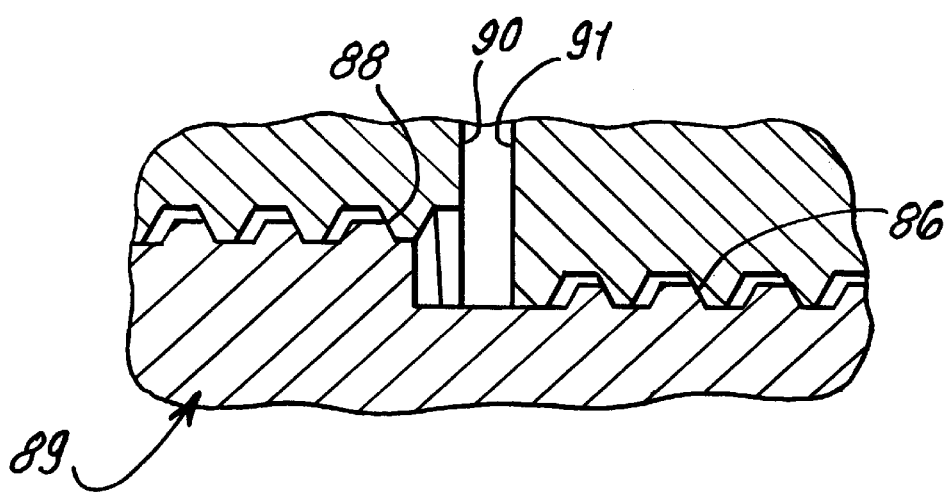
FIG. 8 is an enlarged axial section illustrating differential threads.

In accordance with FIG. 8, the pitch (lead) of flanks 86 on the threads joining the left end of the differentially threaded connector to the rightward end of the work holder is slightly "finer" (less course) than the pitch (lead) of flanks 88 on the threads joining the right end of the connector to the rightward end of the chuck; and application of torque generates a tensile force between the threads at opposite ends of the connector 89. This torque is reacted or resisted by the sum of friction between opposing load flanks, bending and shear, or bending and tensile forces in the load flanks and roots of opposite sets of threads, and ultimately by tension in the body of the connector, which is matched by an increasing compression force in the opposing surfaces 90 and 91 of the chuck, compressing the chuck to grip the work shank 14.

In the context of load line fastening systems, finer (less course) thread pitches or leads means that one of the threads in the differential set is numerically higher than the other. For illustration, assume the pitch of the box threads in the left end of a differentially threaded connector, which engage pin threads on the rightward end of the work holder, is exactly 5.0 millimeters. A normal single start 5.0 mm thread measures 0.196850 inches between common points on the thread form, or a bolt with 5.0 mm threads would advance through a nut 0.196850 inches per turn.

At the other (right) end of the differentially threaded connector, assume that the pitch of the threads, which engage the pin threads on the rightward end of the work holder, is exactly 5 threads per inch. A single start 5 threads per inch thread measures 0.20000 inches between common points, or a bolt with "–5" threads would advance through a nut 0.20000 inches per turn.

Combining these two "standard" threads—one metric, the other an inch series—in the differentially threaded connector yields a net closing rate (NCR) of 0.20000 minus 0.196850 or 0.00315 inch per turn. Thus, after the chuck bottoms into the work, continuing to turn the connector causes pulling of the connector into the chuck faster than it is displaced. Each 90° differentially threaded connector is turned, closes the split by 0.0007875 inches. Other dimensions can be employed.

I claim:

1. Apparatus for adjusting the grip of a rotary tubular chuck upon work, the chuck receivable by a rotating holder, comprising in combination with said chuck:
   a) a rotatable connector member having first and second thread connections for exerting force transmitted to the chuck,
   b) said thread connections characterized as differential, whereby as said member is rotated, the chuck closes toward the work, with high mechanical advantage,
   c) said chuck defining a first axis of rotation,
   d) said connector member defining a second axis generally transverse to the first axis, said axes being non-interconnecting,
   e) said chuck having at least one slit therein which reduces in width as the chuck is urged toward the work, said connector member intersecting said slit,
   f) there being differential thread connections formed in the chuck at axially opposite sides of the slit, to interengage the connector differential thread connections,
   g) said differential threads configured to produce a net closing rate of said slit of no more than 0.00315 inches per turn of the connector member.

2. The combination of claim 1 wherein said chuck defines a tool holding bore, and said rotatable connector member is located externally of and at one side of said tool holding bore.

3. The combination of claim 1 wherein said member is received in the chuck.

4. The combination of claim 1 wherein said connector member second axis extends in skew relation to said chuck tool holding bore.

5. The combination of claim 1 wherein said net closing rate is approximately 0.00315 inches per turn of the connector member.

6. The combination of claim 5 wherein said slit defines a plane that intersects a region on the connector which is between said differential thread connections.

7. The combination of claim 5 wherein said first and second thread connections have first and second threads, respectively, the first thread having first pitch, and the second thread having second pitch, said first and second pitches being different.

8. The combination of claim 5 wherein the chuck has an outer surface portion to engage a conical inner surface portion of a chuck holder, said slit extending toward said conical outer surface portion.

9. Apparatus for adjusting the grip of a rotary tubular chuck upon work, the chuck receivable by a rotating holder, comprising in combination with said chuck:
   a) a rotatable connector member having first and second thread connections for exerting force transmitted to the chuck,
   b) said thread connections characterized as differential, whereby as said member is rotated, the chuck closes toward the work, with high mechanical advantage,
   c) said chuck defining a first axis of rotation,
   d) said connector member defining a second axis generally transverse to the first axis, said axes being non-interconnecting,
   e) said chuck having at least one slit therein which reduices in width as the chuck is urged toward the work, said connector member intersecting said slit,
   f) one differential thread connection on the connector interfitting a corresponding thread on the chuck, at one side of the slit; and the other differential thread connector on the connector interfitting a corresponding thread on an insert in the chuck, and having separate threaded interengagement with the chuck,
   g) said differential threads on the connector member and on the chuck, and on the connector member and on the insert, being configured to produce a net closing rate of said slit of no more than 0.00315 inches per turn of the connector member.

10. The combination of claim 9 wherein the connector first thread connection includes first threads having first load flanks which face in one axial direction, and the connector second thread connection includes second threads having second load flanks which face in the opposite axial direction, the first flanks defining a first pitch and the second threads defining a second pitch, said pitches being different, and each of said connector and insert having an endwise exposed adjustment at one end thereof enabling independent rotary adjustment of the connector and insert.

11. The combination of claim 10 wherein said first thread is at a first radial distance from said second axis, and the second thread is at a second radial distance from said second axis, said first and second radial distances being different.

12. The combination of claim 11 wherein one of said first and second threads is located radially inwardly of the other.

* * * * *